United States Patent [19]

Oguro

[11] 4,105,582
[45] Aug. 8, 1978

[54] COMPOSITION FOR THE CONTROL OF CORROSION AND FOAMING IN THE ACRYLONITRILE PLANTS

[75] Inventor: Yoshiharu Oguro, Tsu, Japan

[73] Assignee: Nalco-Hakuto Chemical Company, Tokyo, Japan

[21] Appl. No.: 809,480

[22] Filed: Jun. 23, 1977

[51] Int. Cl.$^2$ .............................................. C09K 3/00
[52] U.S. Cl. .................................. 252/392; 252/394; 21/2.7 R; 21/2.5 R
[58] Field of Search ............... 252/392, 387, 358, 321, 252/394; 208/47; 21/2.5 R, 2.7 R

[56] References Cited

U.S. PATENT DOCUMENTS

| | | | |
|---|---|---|---|
| 3,109,856 | 11/1963 | Rolland et al. | 252/397 |
| 3,657,136 | 4/1972 | Liberman et al. | 252/321 |

*Primary Examiner*—Benjamin R. Padgett
*Assistant Examiner*—J. L. Barr
*Attorney, Agent, or Firm*—John G. Premo; Robert A. Miller; Barry W. Sufrin

[57] ABSTRACT

A composition and method for the control of corrosion and foam in acrylonitrile plants is disclosed. The composition generally consists of a polypropylene glycol, a glyoxalidine salt of a carboxylic acid and an ethylene glycol monoalkylether. The composition when fed into absorbers, strippers, and quench towers of acrylonitrile plants provides excellent corrosion inhibiting and antifoam properties.

2 Claims, No Drawings

COMPOSITION FOR THE CONTROL OF CORROSION AND FOAMING IN THE ACRYLONITRILE PLANTS

In the past decade one of the compounds which has found extensive use as a basic compound in the preparation of polymeric materials for fiber production, for use in nitrile rubber production and for use as coagulants and dispersants in the water treatment industry is acrylonitrile. Because of this interest, production facilities have been redesigned in order to keep up with the newer production demands and the newer and faster production processes. One of the earliest processes for producing this compound entailed the dehydration of ethylene chlorohydrin made by combining ethylene oxide with hydrocyanic acid. In more recent years the trend has been to utilize the combination of hydrocyanic acid and acetylene. The reaction, according to this process, takes place in a liquid phase with various metal salts such as copper salts as catalysts. Although these processes are still in use, perhaps with variations, additional processes utilizing, for example, the reaction of propylene and ammonia in the presence of oxygen yielding acrylonitrile and water have been found to be highly satisfactory. The latter mentioned process has been most effective since good yields of acrylonitrile are obtained, together with the desirable feature of recovering valuable by-products such as acetonitrile and hydrogen cyanide. This process commonly referred to as the Sohio acrylonitrile process and what is described in Chemical Engineering Progress, Vol. 56, No. 10, pp. 65-67, consists of a catalytic, vapor phase, one-step conversion that is operated at moderate temperatures (below 500° C.) and at ordinary pressures. The catalyst depends for its activity upon a high concentration of active ingredients rather than trace constituents. As with the earlier processes after conversion or reaction, the reaction medium is subjected to various stages for product recovery and purification which may include such techniques as stripping and absorption and in some cases, plain distillation. At this point of the process, the reaction medium contains a whole host of different compounds and, because of the recovery and purification steps, the medium is subject to some agitation.

OBJECTS

It is because of these conditions and the fact that both hydrogen cyanide and water impurities may be present. That both foaming and corrosion of the processing equipment becomes a problem. Corrosion of absorbers, strippers, and quench towers in these units are, of course, to be avoided so as to obtain the maximum amount of use of the process equipment while at the same time avoiding the formation of metallic salts as corrosion by-products which can also create serious problems in their own rights. A corrosion inhibitor and anti-foam in production systems of this type must not effect the purity of the acrylonitrile or the purities of recoverable by-products and moreover the composition must be capable of functioning at temperatures above 200° F. without decomposition to the extent that additional impurities which may present a problem in the recovery of the desired material are not formed.

It would, therefore, be an advantage to the art if a corrosion inhibitor could be obtained for units of this type which would not cause undue foaming in the reactors, absorbers, and other processing equipment while at the same time protecting this equipment from corrosion under general acidic conditions in which they are operated.

It is, therefore, an object of my invention to provide to the art such a composition. The composition of the instant invention comprises from 1-40% by weight water; from 1-40% by weight of an ethylene glycol monoalkylether; from 5-50% by weight of a polypropylene glycol having a molecular weight of from 2,500 to 5,000; and from 10-55% by weight of a glyoxalidine salt of an organic dicarboxylic acid.

It is a further object of this invention to provide to the art a method for the inhibition of corrosion and foam in acrylonitrile production systems of the type wherein propylene is reacted with ammonia in the presence of oxygen and a catalyst which comprises adding to the process stream after it has made contact with the catalyst from 1-100ppm of the composition described above.

Further objects will appear hereinafter.

THE INVENTION

In the production of acrylonitrile by the method described above, water is produced along with substantial quantities of valuable by-products including acetonitrile and hydrogen cyanide. While the reactor flow from the catalyst unit is carefully treated to remove impurities and thus maintain the equipment in good condition, quench towers, absorbers, acrylonitrile distillation units, and acetonitrile strippers, as well as organic recovery units and acrylonitrile concentration units, suffer corrosion due to the water present and acidic impurities present. While work has been done to solve foaming problems in systems of this type, see for example U.S. Pat. No. 3,657,136, no satisfactory corrosion inhibitor compatable with the anti-foams employed have been effectively utilized to treat equipment of this type. I have found that a composition comprising from 1-40% by weight water; from 1-40% by weight of an ethylene glycol monoalkylether; from 5-50% by weight of a polypropylene glycol having a molecular weight of from 2,500 to 5,000; and from 10-55% by weight of a glyoxalidine salt of an organic dicarboxylic acid when added to the system in either one or more locations provides effective corrosion protection while at the same time eliminates foaming problems present in systems of this type. As stated above, the composition of this invention comprises:

A. From 1-40% by weight water;
B. From 1-40% by weight of an ethylene glycol monoalkylether;
C. From 5-50% by weight of a polypropylene glycol having a molecular weight of from 2,500 to 5,000; and,
D. From 10-55% by weight of a glyoxalidine salt of a dicarboxylic acid. Preferably, the corrosion inhibitor anti-foam combination of this invention comprises:

A. From 5-55% by weight water;
B. From 5-50% by weight of an ethylene glycol monoalkylether;
C. From 10-40% by weight of a polypropylene glycol having a molecular weight of from 2,500 to 5,000; and,
D. From 20-40% by weight of a glyoxalidine salt of a dicarboxylic acid containing 5-36 and preferably 5-18 carbon atoms.

The ethylene glycol monoalkylethers useful in this invention are those in which the alkyl group contains from 1–6 carbon atoms. Preferably, this compound will have from 2–5 carbon atoms. Exemplary materials of this type include ethylene glycol monobutylether, ethylene glycol monopropylether, ethylene glycol monoethylether and ethylene glycol monopentylether.

The preferred ethylene glycol monoethylether useful in this invention is ethylene glycol monobutylether which is available commercially as butyl Cellosolve ® available from the Union Carbide Corporation. As stated above, this material is present in the composition of my invention at a level of from 1–40% by weight and preferably from 5–30%. Most preferably, the monoalkylether makes up from 15–25% by weight of the composition.

The polypropylene glycols useful in this invention have a molecular weight ranging from 2,500–5,000. These materials are known commercially available materials, and their method of manufacture will not be labored on in this application. The preferred molecular weight for the polypropylene glycols used in the composition of this invention range from 3,000–4,500 with a molecular weight ranging from 3,500–4,300 being preferred. Most preferred is a polypropylene glycol having a molecular weight of approximately 3,800. This material is present in the composition of this invention at a level of from 5–50% by weight. Most preferably, the polypropylene glycol is used at a level of 25% by weight of the composition. It will be seen by those skilled in the art that this level can be shifted up or down as necessary since the primary object of this component is to prevent foaming in the acrylonitrile processing units. Thus, when more foaming is experienced, it may be desirable to raise the level of this material, while again, if less foaming is taking place, it may be desirable to lower the amount of this material present in the system.

The glyoxalidine salt of the dicarboxylic acids used in this invention are described in several United States patents. Among these patents include: U.S. Pat. Nos. 2,659,731; 2,773,879; 2,945,821; and 2,994,596, all of which are hereinafter incorporated by reference. The glyoxalidine salts can be either monoglyoxalidine salts of the dicarboxylic acid or diglyoxalidine salts of the dicarboxylic acid. These materials are broadly described as aliphatic carboxylic acid salts of a glyoxalidine and an organic aliphatic dicarboxylic acid containing at least five carbon atoms, preferably from 5–36 and most preferably 5–18 carbon atoms, wherein the carbon atom in the 2-position is linked to a higher aliphatic hydrocarbon group containing at least eight carbon atoms, the carbon atom in the 4-position is linked to a member from the group consisting of hydrogen and lower aliphatic groups containing not more than six carbon atoms, the carbon atom in the 5-position is linked to a member from the group consisting of hydrogen and lower aliphatic groups containing not more than six carbon atoms, there being at least one hydrogen atom on each of the carbon atoms in the 4- and 5-positions, and the nitrogen atom is the 1-position is linked to a member from the group consisting of hydrogen and lower aliphatic groups containing not more than six carbon atoms, there being at least one hydrogen atom attached to said nitrogen atom.

These compounds can also be characterized as monoglyoxalidine salts of said organic aliphatic dicarboxylic acids or diglyoxalidine salts of such acids, depending upon whether one or two moles of the glyoxalidine is reacted with the organic aliphatic dicarboxylic acid. If only one mole of the glyoxalidine is reacted with resultant, compound is a monoamine salt containing a free carboxylic acid group. If two moles of the glyoxalidine are reacted the resultant, compound is a diamine salt. The glyoxalidines employed as starting materials are made by well known procedures by reacting a fatty acid with an aliphatic polyamine with the elimination of water as described for example in Wilson, U.S. Pat. No. 2,267,965 and Wilkes, et al, U.S. Pat. No. 2,268,273.

The glyoxalidines with which the present invention is particularly concerned are those in which the glyoxalidine portion of the molecule is derived by reacting together one of the acids or mixtures of acids from the group consisting of lauric acid, myristic acid, palmitic acid, oleic acid, stearic acid, and other fatty acids having from 6–22 carbon atoms, with an aliphatic polyamine from the group consisting of aminoethylethanolamine, diethylenetriamine and triethylenetetramine. When the glyoxalidine is derived from aminoethylethanolamine the resultant product contains a hydroxyethyl group in the 1-position. When the glyoxalidine is derived from diethylenetriamine the resultant product contains an aminoethyl group in the 1-position, and when the glyoxalidine is derived from triethylenetetramine the resultant product contains a (2-aminoethyl) aminoethyl group in the 1-position.

The number of carbon atoms in the aliphatic hydrocarbon group in the 2-position is always one less than that in the aliphatic carboxylic acid from which the glyoxalidine is derived. Thus, if the glyoxalidine is made from lauric acid, the hydrocarbon group in the 2-position will contain 11 carbon atoms. If the glyoxalidine is made from oleic acid, the hydrocarbon group in the 2-position will be a heptadecenyl group containing 17 carbon atoms. The hydrocarbon group in the 2-position preferably contains 13–17 carbon atoms for the purpose of the present invention.

A particularly preferred class of fatty acids for preparing the glyoxalidines of this invention are those which naturally occur in plants and animals, and especially preferred acids are crude tall oil fatty acid mixtures which are available commercially. Typically, these tall oils in the crude form contain roughly 40–60% fatty acid, and from 30–60% rosin acids, although, of course, the composition will depend upon the particular pulp employed. Generally, distilled tall oil which is also useful in this invention comprises from 60–85% fatty acids and 14–37% rosin acids. Again, this composition is highly variable depending upon the particular pulp employed, and, of course, the process employed for pulping and obtaining the tall oil. These materials are available commercially from several different suppliers and need not be elaborated on here. The composition of the fatty acids present in the tall oil generally includes substantial quantities of oleic; stearic; linoleic, both conjugated and non-conjugated; palmitoleic; and palmitic acids. Again, compositions will vary. The rosin acids present in tall oil include abietic, neoabietic, dihydroabietic, tetrahydroabietic, dehydroabietic, dextropimaric, and isodextropimaric acids. A more complete discussion on tall oils and their composition is found in the Encyclopedia of Chemical Technology, Volume 19, pp. 614 through 629.

Specific examples of glyoxalidines that can be reacted with sebacic acid, dilinoleic acid and other long chain organic aliphatic dicarboxylic acids in preparing salts suitable for the purpose of the invention are: 1-(2-hydroxyethyl)-2-undecyl glyoxalidine, 1-(2-hydroxyethyl)-2-tridecyl glyoxalidine, 1-(2-hydroxyethyl)-2-pentadecyl glyoxalidine, 1-(2-hydroxyethyl)-2-heptadecyl glyoxalidine, 1-(2-hydroxyethyl)-2-heptadecenyl glyoxalidine, 1-(2-aminoethyl)-2-undecyl glyoxalidine, 1-(2-aminoethyl)-2-tridecyl glyoxalidine, 1-(2-aminoethyl)-2-pentadecyl glyoxalidine, 1-(2-aminoethyl)-2-heptadecyl glyoxalidine, 1-(2-aminoethyl)-2-heptadecenyl glyoxalidine, 1-[(2-aminoethyl)-aminoethyl]-2-undecyl glyoxalidine, 1-[(2-aminoethyl)-aminoethyl]-2-tridecyl glyoxalidine, 1-[(2-aminoethyl)-aminoethyl]-2-pentadecyl glyoxalidine, 1-[(2-aminoethyl)-aminoethyl]-2-heptadecyl glyoxalidine, 1-[(2-aminoethyl)-aminoethyl]-2-heptadecenyl glyoxalidine, 4-methyl-2-undecyl glyoxalidine, 4-methyl-2-tridecyl glyoxalidine, 4-methyl-2-pentadecyl glyoxalidine, 4-methyl-2-heptadecyl glyoxalidine, 4-methyl-2-heptadecenyl glyoxalidine.

When mixtures of acids are employed such as in the use of the preferred tall oils of this invention, mixtures of the glyoxalidines will also be formed.

The organic aliphatic dicarboxylic acid salts are prepared by mixing a glyoxalidine of the type described and an organic aliphatic dicarboxylic acid of the type described in mole ratios of 1:1 in case it is desired to prepare the monoamine salt, or 2:1 in case it is desired to prepare the diamine salt, and warming the reaction mixture at temperatures sufficient to melt the dicarboxylic acid if it is a solid for 5 to 15 minutes with or without a catalyst until homogeneous materials are obtained.

This material is generally present in the composition at a level of from 10-55% by weight, and more preferably from 10-45%. Most preferably, the glyoxalidine salt is present at a level of 35% by weight of the composition.

Water is often employed in the formulation of this invention, although, it should be pointed out that only minor amounts of water need be present, although, some water is often employed to make the composition fluid. Generally, from 1-40% by weight is employed, and preferably approximately 20% by weight is used in the formulation of the composition of this invention.

It has been found that when compositions formulated as described above are added to acrylonitrile process plants, and more specific, acrylonitrile process plants where the acrylonitrile is made by the vapor phase reaction of propylene and ammonia over a catalyst, corrosion and foaming problems present in later stages of the working up of this material can be avoided. Generally, in the course of this invention from 1-100ppm of the composition of the instant invention and preferably from 2-50ppm of the composition described above is added to the process stream at a point to enable the composition to be present in both the quenching towers, absorbers, acrylonitrile recovery units, acetonitrile by-product stripping units, and heavy organic as well as waste water recovery units. Oftentimes, depending upon the particular layout of the plant, it will be necessary to add the material of this invention in more than one location. Suitable places for addition of this material include the sulfuric acid neutralization line that is generally employed in the quench tower, as well as in the organic waste recovery unit.

In order to further illustrate this invention, the following examples are presented.

EXAMPLE I

A glyoxalidine composition was prepared by reacting 30 parts by weight of aminoethylethanolamine with 70 parts by weight of a tall oil fatty acid. 88.5 parts of this material was then reacted with 11.5 parts by weight of azelic acid (1, 7-heptane dicarboxylic acid). 35 parts by weight of the composition so formed was then blended with 25 parts by weight of a polypropylene glycol having an approximate molecular weight of 3,800, 20 parts by weight butyl Cellosolve ® (monobutylether of ethylene glycol), and 20 parts by weight water. The above composition was fed into the quench tower of an acrylonitrile process installation. Previous to the introduction of this material, the corrosion rate in this particular unit was approximately 20 millimicrons per year. Since the introduction of 10ppm of the above composition into the quench tower, corrosion has gone down to less than 8 millimicrons per year. It should be pointed out that this treatment is most effective only when ammonia in the process stream is neutralized with sulfuric acid as is done routinely in most commercial operations.

Corrosion was also evident in the reboiler of the concentration tower in this particular unit. Ten ppm of the above composition being fed at a pH of seven reduced corrosion and fouling significantly.

I claim:

1. A method for the inhibition of corrosion in acrylonitrile production systems of the type wherein propylene is reacted with ammonia in the presence of oxygen and a catalyst which comprises adding to the process stream after it has made contact with the catalyst from 1-100ppm of a composition comprising:
  A. From 1-40% by weight water;
  B. From 1-40% by weight of an ethylene glycol monoalkylether;
  C. From 5-50% by weight of a polypropylene glycol having a molecular weight of from 2,500 to 5,000; and,
  D. From 10-55% by weight of a glyoxalidine salt of a dicarboxylic acid in which the glyoxalidine portion of the molecule is obtained by reacting an aliphatic polyamine from the group consisting of amino ethanol amine, diethylene triamine, and triethylene tetraamine with a fatty acid containing 6-22 carbon atoms.

2. A composition for inhibiting corrosion in acrylonitrile production systems of the type wherein propylene is reacted with ammonia in the presence of oxygen and a catalyst, said composition being added to the production stream after the propylene, ammonia and oxygen have been contacted with the catalyst at a level of from 1-100ppm said composition comprising:
  A. From 1-40% by weight water;
  B. From 1-40% by weight of an ethylene glycol monoalkylether;
  C. From 5-50% by weight of a polypropylene glycol having a molecular weight of from 2,500 to 5,000; and,
  D. From 10-55% by weight of a glyoxalidine salt of a dicarboxylic acid in which the glyoxalidine portion of the molecule is obtained by reacting an aliphatic polyamine from the group consisting of amino ethanol amine, diethylene triamine, and triethylene tetraamine with a fatty acid containing 6-22 carbon atoms.

* * * * *